(12) United States Patent
Lai

(10) Patent No.: US 6,810,322 B2
(45) Date of Patent: Oct. 26, 2004

(54) MULTISOURCE TARGET CORRELATION

(75) Inventor: Chih Lai, Woodbury, MN (US)

(73) Assignee: Garmin AT, Inc., Salem, OR (US)

( * ) Notice: Subject to any disclaimer, the term of this patent is extended or adjusted under 35 U.S.C. 154(b) by 0 days.

(21) Appl. No.: 10/361,305

(22) Filed: Feb. 10, 2003

(65) Prior Publication Data

US 2003/0154018 A1 Aug. 14, 2003

Related U.S. Application Data

(63) Continuation of application No. 09/873,969, filed on Jun. 4, 2001, now Pat. No. 6,542,810.
(60) Provisional application No. 60/217,230, filed on Jul. 10, 2000.

(51) Int. Cl.[7] .............................................. G06F 19/00
(52) U.S. Cl. ..................... 701/120; 340/945; 340/500; 340/970
(58) Field of Search .................... 701/120, 1; 340/945, 340/500, 970, 971, 973

(56) References Cited

U.S. PATENT DOCUMENTS

| | | |
|---|---|---|
| 3,887,916 A | 6/1975 | Goyer |
| 4,196,474 A | 4/1980 | Buchanan et al. |
| 4,782,450 A | 11/1988 | Flax |
| 4,789,865 A | 12/1988 | Litchford |
| 4,970,518 A * | 11/1990 | Cole, Jr. ....................... 342/37 |
| 5,077,673 A | 12/1991 | Brodegard et al. |
| 5,157,615 A | 10/1992 | Brodegard et al. |
| 5,208,591 A * | 5/1993 | Ybarra et al. ................ 340/961 |
| 5,285,380 A | 2/1994 | Payton |
| 5,374,932 A * | 12/1994 | Wyschogrod et al. .......... 342/36 |
| 5,459,469 A * | 10/1995 | Schuchman et al. ........... 342/37 |
| 5,477,225 A * | 12/1995 | Young et al. .................. 342/46 |
| 5,493,309 A | 2/1996 | Bjornholt |
| 5,519,618 A * | 5/1996 | Kastner et al. .............. 701/120 |
| 5,557,278 A * | 9/1996 | Piccirillo et al. .............. 342/29 |
| 5,596,332 A | 1/1997 | Coles et al. |
| 5,798,726 A * | 8/1998 | Schuchman et al. ........... 342/37 |
| 5,883,586 A | 3/1999 | Tran et al. |
| 6,064,335 A | 5/2000 | Eschenbach |
| 6,542,810 B2 * | 4/2003 | Lai ............................. 701/120 |

OTHER PUBLICATIONS

Akira Miura, Hiroyuki Morikawa, Moriyuki Mizumachi; *Air Traffic Control Data Tables for Conflict Alert System; Electronics and Communications in Japan, Part 1*; 1996; pp. 101–113; vol. 79, No. 6; Translated from *Denshi Joho Tsushin Gakkai Ronbunshi*; vol. 78–B–II, Apr. 1995, pp. 240–249; 1996 Scripta Technica, Inc.; ISSN8756–6621/96/0006–0101; XP 000588958.

* cited by examiner

Primary Examiner—Thomas G. Black
Assistant Examiner—Olga Hernandez
(74) Attorney, Agent, or Firm—Devon A. Rolf

(57) ABSTRACT

An improved method for correlating between targets in an air traffic control system. A methods or systems according to the invention compare selected components of a first target report to the components of a second target report, produce a confidence level on each component comparison, and determine whether to declare the targets similar based on the confidence level on each component compared. The first and second target reports may include ADS-B target reports and TIS target reports. The individual components of the reports may be range, bearing, track angle, and relative altitude. The methods or systems may use a fuzzy logic probability model to produce a continuous confidence level on each component comparison.

13 Claims, 6 Drawing Sheets

MULTISOURCE TARGET CORRELATION

CROSS REFERENCE TO RELATED APPLICATIONS

This application is a continuation of U.S. application Ser. No. 09/873,969, filed Jun. 4, 2001 now U.S. Pat. No. 6,542,810, which claims priority from U.S. Provisional Patent Application No. 60/217,230, filed Jul. 10, 2000, which are hereby incorporated herein in their entireties by reference.

FIELD OF THE INVENTION

The present relates to a method and system for multisource target correlation and, more particularly to a method and system for multisource air/ground traffic control target correlation.

BACKGROUND OF THE INVENTION

The recent advent of the use of Automatic Dependent Surveillance-Broadcast (ADS-B), an advanced air ground traffic control system, has facilitated the integration of this system with the pre-existing Traffic Information System (TIS).

ADS-B is a technology which allows aircraft to broadcast information such as identification, position, altitude. This broadcast information may be directly received and processed by other aircraft or received and processed by ground systems for use in improved situational awareness, conflict avoidance and airspace management. ADS-B incorporates the use of Global Positioning System (GPS) or other similar navigation systems as a source of position data. By using GPS or the like, ADS-B has the capacity to greatly improve the efficiency and safety of the National Airspace System.

ADS-B provides for an automatic and periodic transmission of flight information from an in-flight aircraft to either other in-flight aircraft or ground systems. The ADS-B transmission will typically comprise information items such as altitude, flight ID, GPS (Global Positioning System) position, velocity, altitude rate, etc. The transmission medium for ADS-B can implement VHF, 1090 MHz (Mode S), UHF (UAT), or a combination of systems.

TIS is a technology in which air traffic control Secondary Surveillance Radar (SSR) on the ground transmits traffic information about nearby aircraft to any suitably equipped aircraft within the SSR range. The transmissions are addressed to a particular aircraft, and are sent together with altitude or identity interrogations. This lets an aircraft receive information about nearby aircraft, which do not have ADS-B capability, but are being interrogated by the SSR radar. The TIS information, like ADS-B information, is directed to a CDTI display for the benefit of the flight crew.

Traffic alert and Collision Avoidance Systems (TCAS) functionality can be improved with the GPS positioning capabilities of the ADS-B system. Such GPS position information will aid TCAS in determining more precise range and bearing at longer ranges. With greater precision, commercial aircraft can achieve higher safety levels and perform enhanced operational flying concepts such as in-trail climbs/descents, reduced vertical separation, and closely sequenced landings.

Additionally, ADS-B can also be used to extend traffic surveillance over greater distances. Previous technology limited surveillance ranges to a maximum of about 40 nautical miles (nm). ADS-B, since it does not require an active TCAS interrogation to determine range and bearing, will not be subject to a power limitation. As a result, in general, the ADS-B receiver capability determines surveillance range. For example, if the ADS-B receiver can process an ADS-B transmission out to 100 nm, then 100 nm is the effective range.

However, for ADS-B to be fully effective it must be implemented on both the aircraft transmitting and receiving ABS-B and all target aircraft within range. If one aircraft has ADS-B and the other does not, neither aircraft can achieve the full benefits of its use. Each aircraft remains "blind" to the other. For full implementation of ADS-B to occur all existing aircraft would require new technologies and equipment, including GPS sensors, some form of ADS-B transceiver, upgraded displays to present ADS-B target aircraft, and some form of data concentrator to collect and process all the appropriate ADS-B data. This would require most of the aircraft flying today to be extensively re-wired and re-equipped with new hardware.

As a result of the problems related to integrating ADS-B into the present fleet of aircraft, ADS-B equipped aircraft, as well as non-ADS-B equipped aircraft, must be capable of receiving positioning information from Traffic Information System (TIS) messages transmitted from ground stations. The ADS-B and TIS position information are processed in-flight, and the position of surrounding targets is displayed graphically on a cockpit display of traffic information (CDTI) unit located in each aircraft.

Because TIS information does not possess the same level of resolution quality as that of ADS-B and because of signal interference, it is possible that the traffic information for the same set of surrounding aircraft reported by TIS and ADS-B do not match. An on-board computer must correlate this conflicting traffic information and display one symbol (e.g., icon) on the CDTI for each actual aircraft. It is known that a suitable TIS/ADS-B correlation algorithm may be constructed based on the MIT Lincoln Lab's report 42PM-DataLink-0013 (hereafter referred to as the MIT Algorithm). The MIT Algorithm comprises essentially three steps:

1. Evaluate the similarity between every TIS target and every ADS-B target.
2. Store the evaluated similarities into a correlation array.
3. Correlate the TIS target with the ADS-B target that are similar and closest to each other.

In step 1, the similarity between each TIS target and each ADS-B target is set as a binary logic function in which the bearing, range, relative altitude and track of each TIS and ADS-B target is compared to evaluate the similarity. Since binary logic rigidly produces the output of either yes (1) or no (0) to each comparison, it may fail to correlate two aircraft if only one single condition of the logic narrowly fails. For example, if one target makes a 45 degree turn according to ADS-B and a 47 degree turn according to TIS then the result is a no (0) in step 1 of the MIT algorithm and the targets are not correlated (i.e., two targets appear on the CDTI). This binary inflexibility significantly reduces the accuracy of the MIT algorithm, especially when targets are performing maneuvers. It is believed by those skilled in the art that the MIT algorithm may only produce a successful correlation rate of about 75 percent.

Therefore, an unresolved need exists for a more accurate and reliable method for correlating TIS and ADS-B target information.

SUMMARY OF THE INVENTION

The present invention provides improved correlation between targets from two different target reporting sources, such as TIS and ADS-B, in an air traffic awareness system. A method or system according to the invention compares selected components of a TIS report to the corresponding components of an ADS-B report, produces a confidence level on each component comparison, and combines the confidence levels to determine whether to declare the two targets similar. The individual components of the TIS and ADS-B reports may be range (between "ownship" and a reported target), bearing, track angle, and relative altitude.

In a preferred embodiment, the systems and methods according to the invention use a fuzzy logic (probability model) to produce a continuous confidence level on each component comparison. Generally described, the continuous confidence level of each component is computed based on a comparison between the respective TIS component and a predetermined TIS value(s). The predetermined TIS value is, typically, derived empirically from flight test data. Once the comparison is performed, the continuous confidence level of each component is defined as a function of the ADS-B component. A total confidence level is derived by summing the continuous confidence levels of each component. The total confidence level is then compared to a predefined threshold level to determine whether the TIS and ADS-B targets are similar.

Once a determination is made that targets are similar a correlation array is constructed, a correlation process ensues whereby a selection of nearest TIS target to ADS-B target is performed and CDTI is presented to the pilot in the form of target display.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention provides improved systems and methods for correlating TIS target and ADS-B targets in an air/ground traffic control system to minimize or eliminate the display of two icons for the same target on the CDTI of an aircraft. The present invention essentially improves the MIT correlation algorithm by replacing the MIT binary logic method of correlation for evaluating the similarity of received targets with a fuzzy logic probability model.

Figure 1:
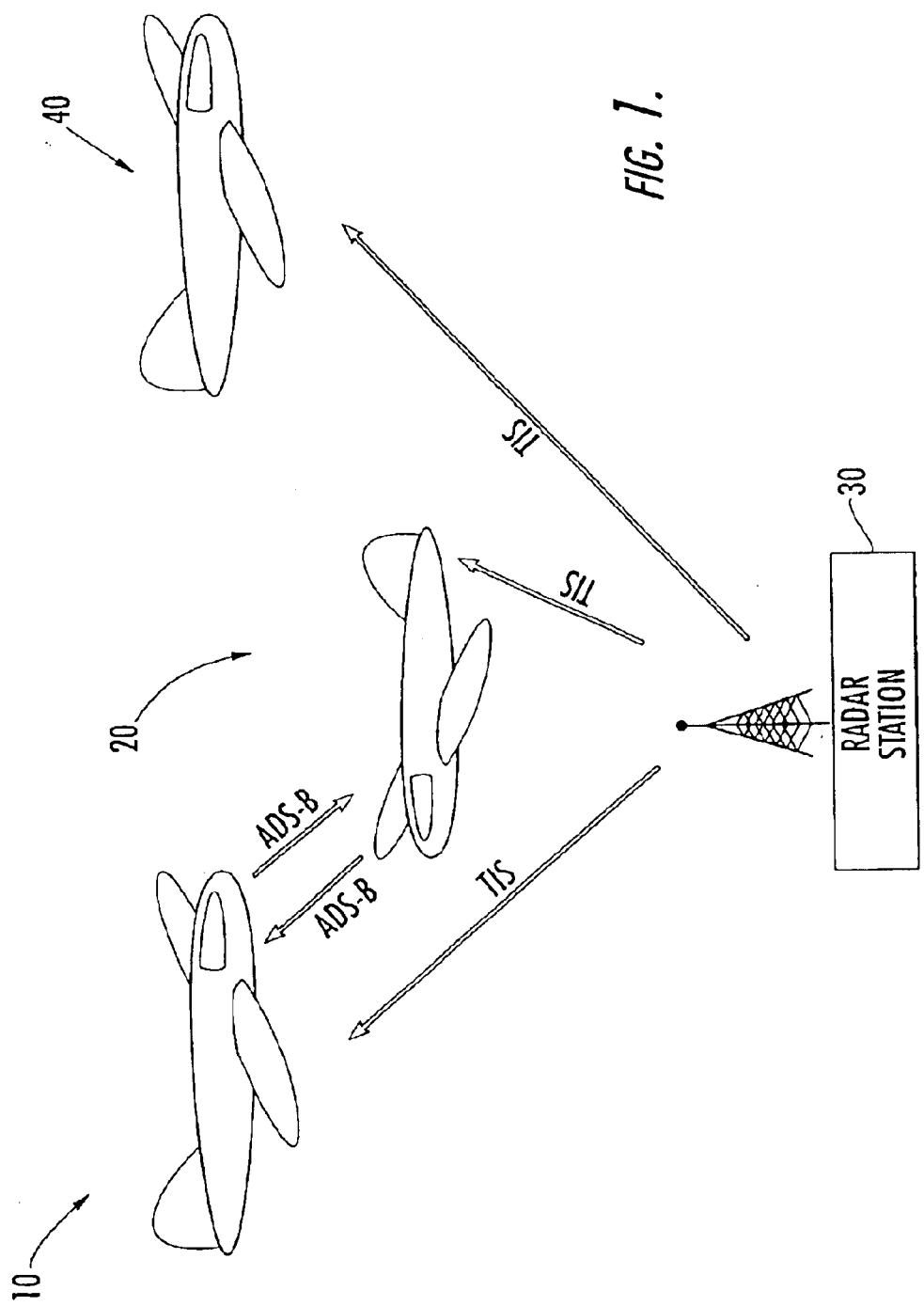
FIG. 1 is a schematic illustration of aircraft communication in an air traffic control system, in accordance with an embodiment of the present invention.

As shown in FIG. 1, a first aircraft 10 that is equipped with ADS-B technology transmits and receives ADS-B information to and from surrounding aircraft equipped with ADS-B technology, such as second aircraft 20. These two aircraft are also equipped with the capability to receive TIS information, transmitted from ground-based stations such as station 30, so that they are aware of targets that are not equipped with ADS-B technology, such as third aircraft 40. By receiving TIS messages, the third aircraft 40 is also aware of aircraft 10 and 20 in its airspace. Also, each aircraft 10, 20 further includes a correlation device, such as a computer-based system programmed in accordance with an embodiment of the present invention, for implementing the methods of the present invention as set forth herein.

As an initial matter, a brief discussion of the information comprising a TIS broadcast and an ADS-B broadcast is provided. Each TIS message or broadcast that is sent from the ground radar station will typically comprise the following information for each target aircraft:

1. Bearing, defined as the angle from the ownship to the target aircraft with respect to the ownship track over the ground, quantized in about 6-degree increments.
2. Range, defined as the distance between the ownship and the target aircraft, quantized in about 0.125-nm increments
3. Relative Altitude, defined as the difference in altitude between the target aircraft and the ownship, quantized in about 100-foot increments. A positive value indicates that the aircraft is above the ownship, while a negative value indicates that the aircraft is below the ownship.
4. Track, defined as the ground track angle of the target aircraft, quantized to 45-degree increments.

Each extended ADS-B message or broadcast that is sent from an equipped aircraft will typically comprise the following information fields:

1. Latitude and Longitude. The aircraft's current geographical position defined in latitude and longitude.
2. North-South and East-West Velocity. North-South and East-West components of the aircraft's East-West horizontal velocity, quantized in 0.125-knot increments.
3. Pressure Altitude. The aircraft's barometric altitude, quantized in either 100-foot or 25-foot increments.

The ownship receives and uses the above ADS-B message data, in addition to its own position and altitude data, to calculate components equivalent to the Bearing, Range, Relative Altitude and Track components of the TIS message.

As discussed above in the Background of the Invention, the currently implemented TIS/ADS-B correlation algorithm is constructed based on MIT Lincoln Lab's report 42PM-DataLink-0013. In a simplified format the three steps in the MIT's algorithm can be defined as follows:

1. Evaluate the similarity between every TIS target and every ADS-B target.
2. Store the evaluated similarities into a correlation array.
3. Correlate the TIS target with the ADS-B target that are similar and closest to each other.

The MIT algorithm implements a combined binary logic function to administer step 1. In doing so the MIT algorithm compares the information fields of bearing, range, relative altitude, and track of each TIS and ADS-B target to evaluate the similarity of each TIS and ADS-B target. As discussed above, the MIT algorithm binary logic function for step 1 reduces the chance of correlating TIS/ADS-B targets, especially when aircraft maneuver.

In accordance with the present invention, a method for correlating between ADS-B and TIS target information is provided. The method comprises comparing selected components of a TIS report to the components of an ADS-B report, typically range, bearing, relative altitude and track angle. Once the comparison is completed then the method produces a confidence level on each component comparison, and combines the confidence levels produced by comparing the components to produce a total confidence level used to determine whether to declare the targets similar.

The present invention replaces the MIT binary logic approach with a fuzzy logic implementation. As is known by those of ordinary skill in the art, fuzzy logic comprises a probability model that produces a continuous confidence level on each comparison. That is, rather than producing a binary output (i.e., "0" or "1"), the output can be any real number. The confidence levels produced on each comparison are combined to make up the final correlation decision. Specifically, the combined confidence levels are compared to an empirically determined threshold to determine if the targets are similar.

In accordance with the present invention, the following exemplary pseudo code demonstrates the fuzzy logic used in evaluating the similarity of individual TIS and ADS-B target and producing a confidence level. For the purpose of the pseudo code TISR, TISB, TIST, and TISA are defined as the range, bearing and, track angle, and relative altitude reported in a TIS report, respectively. Likewise, DR, DB, DT, and DA are defined as the range, bearing, track angle, and relative altitude reported in an ADS-B report.

```
Function Correlation (TISR, TISB, TIST, TISA, DR, DB,
    DA, DT) TISA=ABS (TISA)
if ((ChkRng(TISR, DR)+ChkBr(TISR, DB)+ChkAlt
    (TISA, DA)+ChkTk(DT))>4)
    return 1
else
    return 0
```

Figure 2:
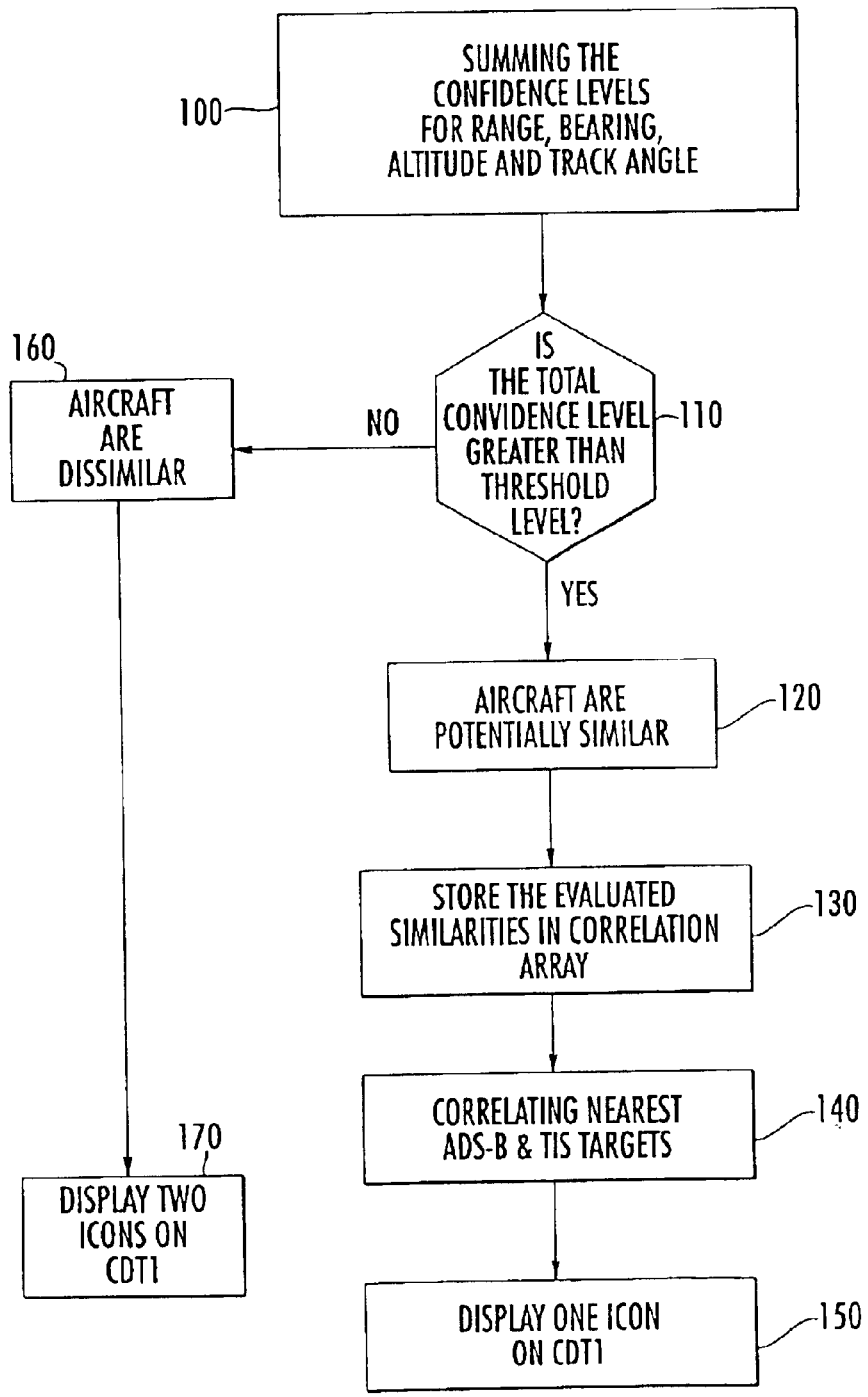
FIG. 2 is a flow diagram for combining the confidence levels of the individual selected components into a total confidence level value and determination, in accordance with an embodiment of the present invention.

Thus, as described in the flow diagram of FIG. 2, at step 100, the checks for range, bearing, track angle and relative altitude are summed. (The pseudo code and flow diagram representations for these checks are forthcoming in the detailed disclosure.) The resulting sum of the checks being defined as the total confidence level for correlation of the TIS and ADS-B reports. After the total confidence level has been derived, at step 110, a determination is made as to whether the total confidence level is greater than a predefined threshold level. In the embodiment of the invention illustrated by the pseudo code above the predetermined threshold level is defined as four, although, it should be apparent that this number was predetermined for a specific set of check functions and a desired level of confidence. Other threshold levels of confidence may also be set and are within the inventive concepts herein disclosed.

If the threshold level of confidence has been met then, at step 120, the aircraft are determined to be similar and, proceeding to step 130, they are candidates for further correlation under step 2 of the MIT algorithm (storing the evaluated similarities into a correlation array) and, at step 140, step 3 of the MIT algorithm (correlating the nearest TIS target with the nearest ADS-B target). Once the remaining portion of the MIT algorithm has correlated the targets, then, at step 150, a single icon is displayed on the CDTI to represent one target.

If the threshold level of confidence has not been met then, at step 160, the aircraft are determined to be dissimilar and, step 170 ensues, two icons are displayed on CDTI to represent two separate targets.

In accordance with the present invention, the following pseudo code and corresponding flow diagrams illustrate the check functions that are implemented to evaluate the similarities of range, bearing, track angle, and relative altitude between one TIS and one ADS-B report.

Check Function for Range

An illustrative embodiment of the pseudo code for the check function for range is defined as follows, with TISR being the range for the TIS report and DR being the range for the ADS-B report.

```
function ChkRng(TISR, DR)
    (function to check range between TIS & ADS-B reports)
    if (TISR<=1)
        tmp=(0.531 DR)/0.5
    else
        if ((TISR<=3) & (TISR>1))
            tmp=(1-DR)
        else
            if (TISR>3)
                tmp=(1.5-DR)/1.5
    if (tmp>=0)
        return (1+tmp*0.15)
    else
        return (1+tmp*1.5)
```

Figure 3:
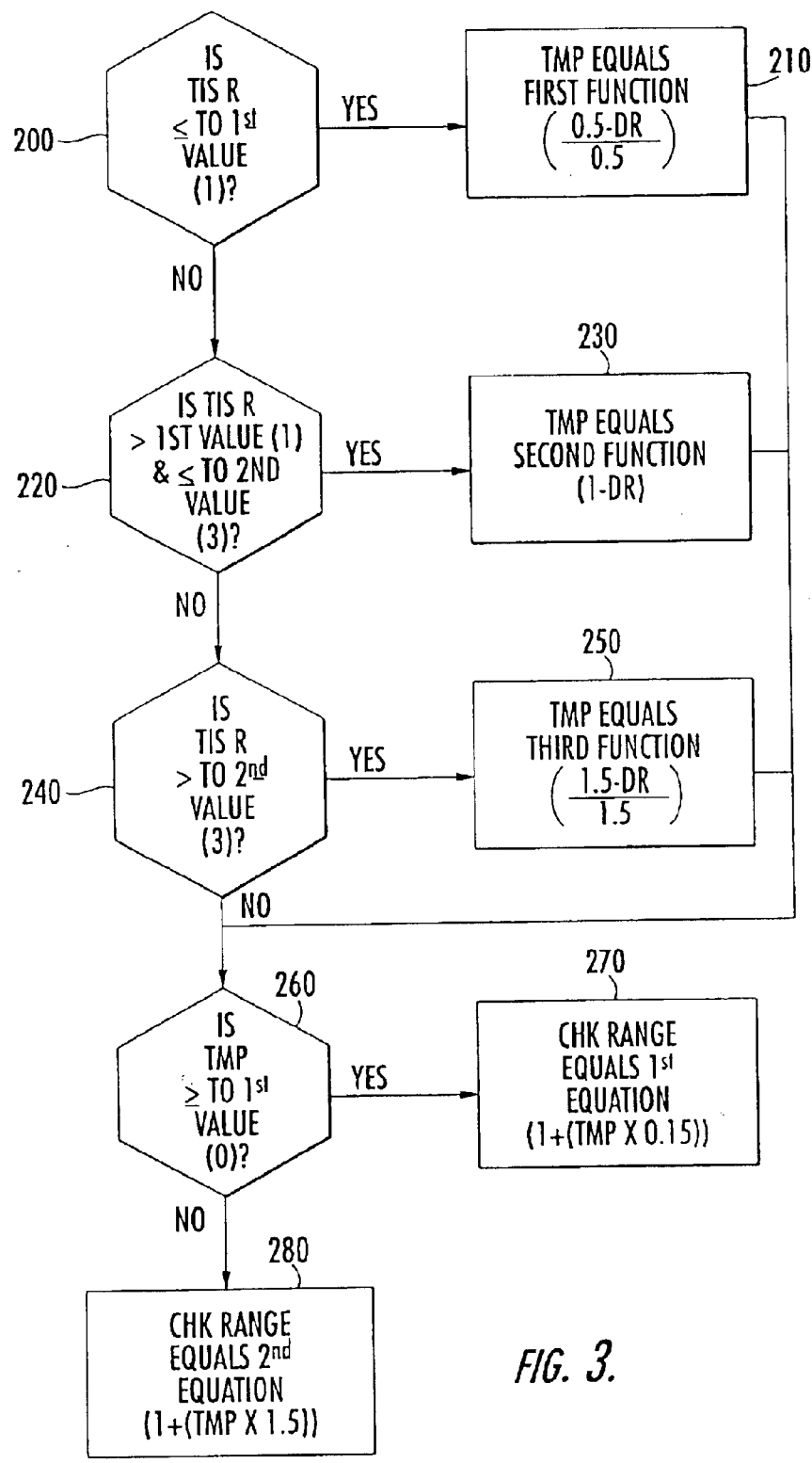
FIG. 3 is a flow diagram for producing a confidence level for range from corresponding TIS and ADS-B reports, in accordance with an embodiment of the present invention.

Thus, as described in the flow diagram of FIG. 3, at step 200, an analysis is made to determine if the TIS report range is less than or equal to a first predetermined value, in this instance the first predetermined value is one. If the step 200 analysis finds the TIS range below or equal to the first predetermined value then, at step 210, a temporary check value is defined by a first predetermined equation, in the embodiment shown the first temporary check value is equal to (0.5−DR) divided by 0.5. If the step 200 analysis finds the TIS range above the first predetermined value then, at step 220, an analysis is made to determine if the TIS report range is less than or equal to a second predetermined value, in this instance the second predetermined value is three. If the step 220 analysis finds the TIS range below or equal to the second predetermined value then, at step 230, a temporary check value is defined by a second predetermined equation, in the embodiment illustrated the second temporary check value is equal to (1.0−DR). If the step 220 analysis finds the TIS range above the second predetermined value then, at step 240, an analysis is made to determine if the TIS report range is above the second predetermined value, in this instance the second predetermined value is three. If the step 240 analysis finds the TIS range above the second predetermined value then, at step 250, a temporary check value is defined by a third predetermined equation, in the embodiment illustrated the third temporary check value is equal to (1.5−DR) divided by 1.5.

Once the temporary check value has been assigned then, at step 260, an analysis is made to determine if the temporary check value is greater than or equal to a predetermined value, in this instance the predetermined check value is zero. If the step 260 analysis determines that the temporary check value is greater than or equal to the predetermined value then, at step 270, the check range is defined as a first predetermined function, in this embodiment the check range is defined as (1+(the temporary check multiplied by 0.15)). If the step 260 analysis determines that the temporary check value is less than the predetermined check value then, at step 280, the check range is defined as second predetermined function, in this embodiment the check range is defined as (1+(the temporary check multiplied by 1.5)).

Check Function for Bearing

An illustrative embodiment of the pseudo code for the check function for bearing is defined as follows, with TISB being the bearing for the TIS report and DB being the bearing for the ADS-B report.

function ChkBr(TISB, DB)
    (function to check bearing between TIS & ADS-B reports)
      if (TISB<=1)
        return 1
      else
      if ((TISB<=2) & (TISB>1))
        tmp=(18-DB)/18
      else
      if (TISB>2)
        tmp=(12-DB)/12
      if (tmp>=0)
        return (1+tmp*0.1)
      else
        return (1+tmp*0.08)

Figure 4:
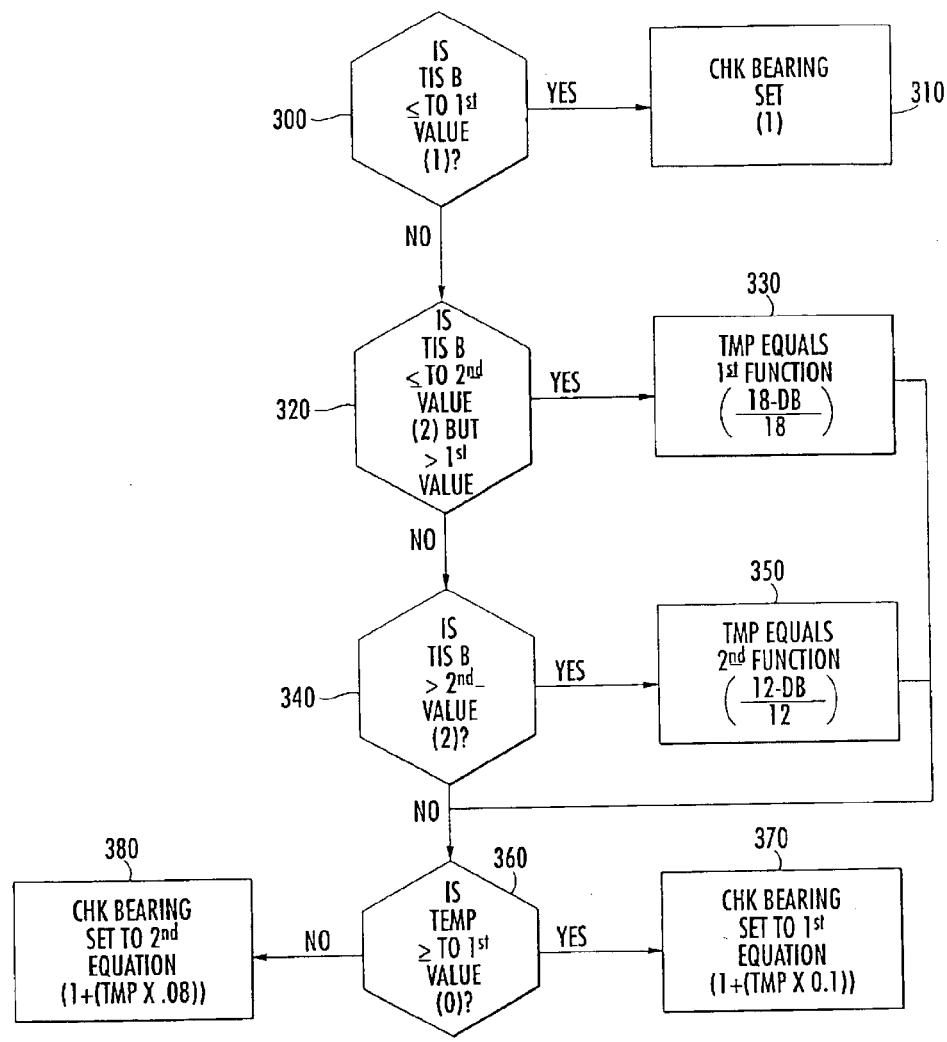
FIG. 4 is a flow diagram for producing a confidence level for bearing from corresponding TIS and ADS-B reports, in accordance with an embodiment of the present invention.

Thus, as described in the flow diagram of FIG. 4, at step 300, an analysis is made to determine if the TIS report bearing is less than or equal to a first predetermined value, in this embodiment the first predetermined value is one. If the TIS bearing is determined to be less than or equal to the first predetermined value then, at step 310, a check bearing function is set, in this embodiment it is set to a value of one. If the TIS bearing is determined not to be less than or equal to the first predetermined value then, at step 320, an analysis is made to determine if the TIS bearing is less than or equal to a second predetermined value, in this instance the second predetermined value is two, although any value greater than the first predetermined value may be implemented. If true, at step 330, a first temporary check function is defined, in this embodiment the temporary check function is defined as (18-DB)/18. If not true, at step 340, an analysis is made to determine if the TIS bearing is greater than the second predetermined value, in this instance the second predetermined value is two. If the TIS bearing is determined to be greater than the second predetermined value the, at step 350, a second temporary check function is defined, in this embodiment the second temporary check function is defined as (12-DB)/12.

Once a temporary check function has been defined then, at step 360, an analysis is made to determine if the temporary check function is greater than or equal to a predetermined temporary check function value, in this embodiment this value is zero. If it is determined that the temporary check function is greater than or equal to the predetermined value then, at step 370, the check bearing function is defined by a first check bearing equation, in this embodiment the first check function equation is (1+(temporary check multiplied by 0.1)). If it is determined that the temporary check function is less than the predetermined value then, at step 380, the check bearing function is defined by a second bearing equation, in this embodiment the second check function equation is (1+(temporary check multiplied by 0.08)).

Check Function for Relative Altitude

An illustrative embodiment of the pseudo code for the check function for relative altitude is defined as follows, with TISA being the relative altitude for the TIS report and DA being the relative altitude for the ADS-B report.

function ChkAlt(TISA, DA)
    (function to check relative altitude between TIS & ADS-B reports)
      if (TISA<=1000)
        tmp=(200-DA)/200
      else
        if (TISA>1000)
          tmp=(500-DA)/500
      return (1+tmp*0.15)

Figure 5:
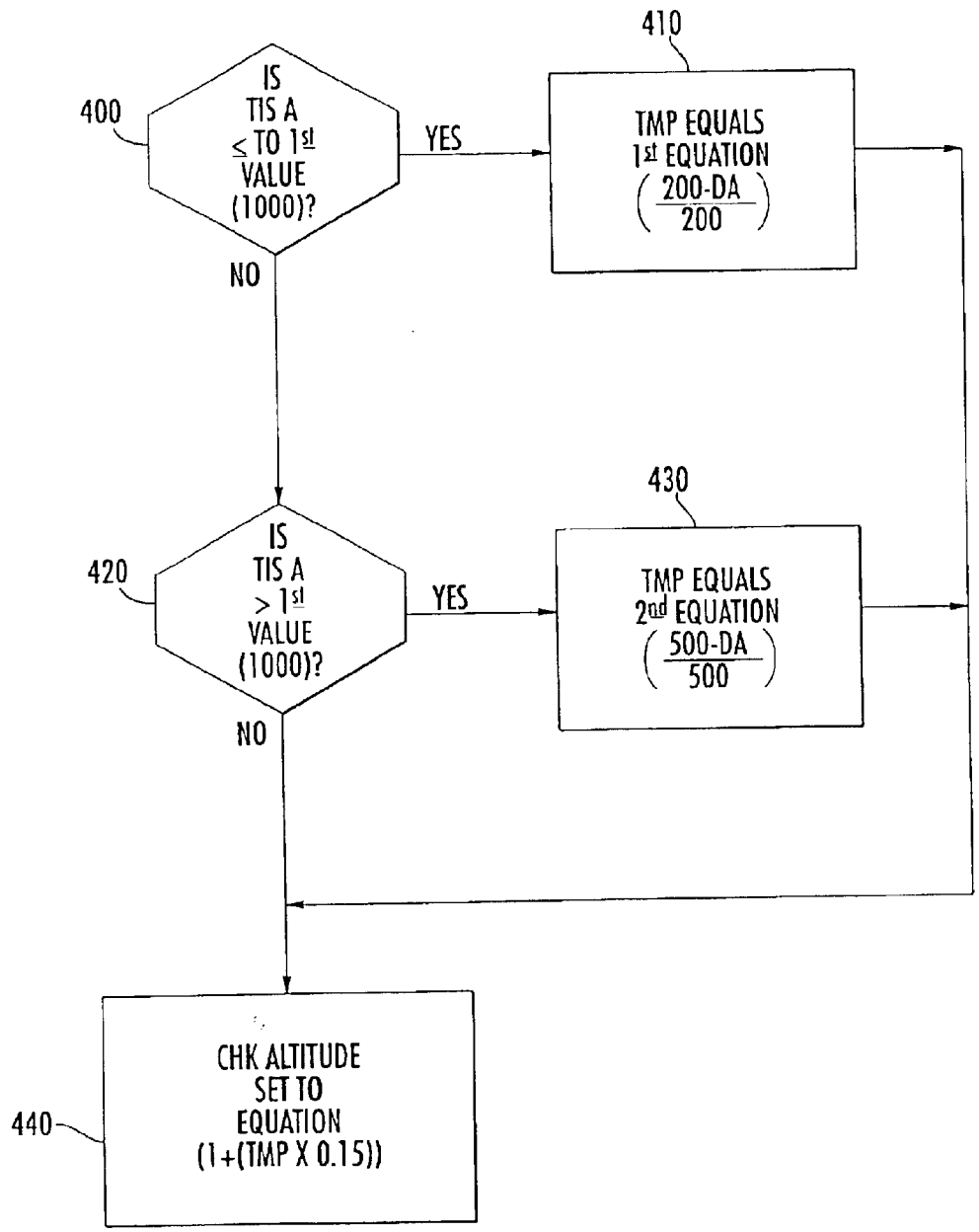
FIG. 5 is a flow diagram for producing a confidence level for relative altitude from corresponding TIS and ADS-B reports, in accordance with an embodiment of the present invention.

Thus, as described in the flow diagram of FIG. 5, at step 400, an analysis is made to determine if the TIS relative altitude is less than or equal to a first predetermined value, is this embodiment the first predetermined value is one thousand. If the TIS relative altitude is determined to be less than or equal to the first predetermined value then, at step 410, a first temporary check function is defined, in this instance the first temporary check function is defined as (200-DA)/200. If the TIS relative altitude is determined not to be less than or equal to the first predetermined value, then at step 420, an analysis is made to determine if the TIS relative altitude is greater than the first predetermined value, in this embodiment the first predetermined value is one thousand (1,000). If the TIS relative altitude is determined to be greater than the first predetermined value then, at step 430, a second temporary check function is defined, in this instance the second temporary check function is defined as (500-DA)/500. Once the temporary check function has been set then, at step 440, the check relative altitude function is defined, in this embodiment the check relative altitude function is defined as (1+(temporary check multiplied by 0.15)).

Check Function for Track Angle

An illustrative embodiment of the pseudo code for the check function for track angle is defined as follows, with DT being the track angle for the ADS-B report.

function ChkTk(DT)
    (function to check track angle between TIS & ADS-B reports)
      tmp=(45-DT)/45
      return (1+tmp*0.1)

Figure 6:
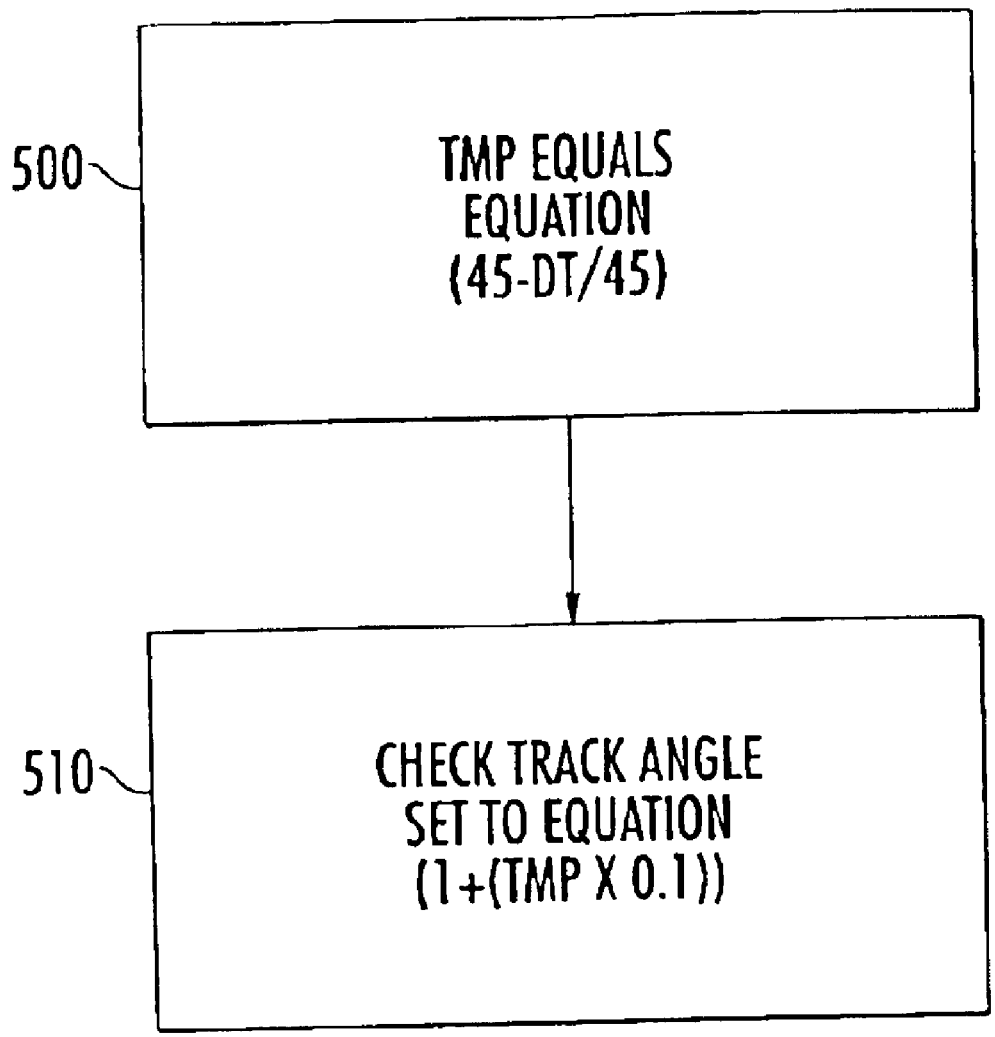
FIG. 6 is a flow diagram for producing a confidence level for track angle from corresponding TIS and ADS-B reports, in accordance with an embodiment of the present invention.

Thus, as described in the flow diagram of FIG. 6, at step 500, the temporary check function is defined in terms of the ADS-B report track angle, in this embodiment the temporary check function is defined as (45-DT)/45. Once the temporary check function is defined, then at step 510, the check track angle function is defined, in this embodiment the check track angle function is defined as (1+(temporary check multiplied by 0.1)).

It should be noted that the various determinations, functions and equations shown in the pseudo code and accompanying flow charts (FIGS. 2–6) are by way of example only. Generally described, the continuous confidence level of each component is computed based on a comparison between the respective TIS component and a predetermined TIS value(s). The predetermined TIS value is, typically, derived empirically from flight test data. Once the comparison is performed, the continuous confidence level of each component is defined as a function of the ADS-B component. Other implementations of fuzzy logic probability models that produce a continuous confidence level for the various comparisons are also possible and within the inventive concepts herein disclosed.

Once all check functions (i.e. continuous confidence levels) for range, bearing, relative altitude and track angle have been derived and a confidence level output has been determined by summing the check functions and comparing the summed total to a predetermined threshold value, then a correlation array is constructed with said outputs. The step of constructing the correlation array corresponds to step 2 of the MIT algorithm. Finally, a correlation process allows for the selection of the nearest TIS target to each ADS-B target that is similar. This step of correlation corresponding to step 3 of the MIT algorithm. The corresponding TIS and ADS-B target(s) can then be presented to the pilot via the CDTI.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Wherefore the following is claimed:

1. A method for target correlation between target information in an air traffic control system, the method comprising:

comparing selected components of a first target report associated with a first target surveillance service and a first target to selected components of a second target report associated with a second target surveillance service and a second target;

producing a confidence level for each component comparison; and determining whether the first target of the first target retort and the second target of the second target report represent the same target based on the confidence level for each component compared, wherein comparing selected components of a first target report associated with a first target surveillance service and a first target to selected components of a second target report associated with a second target surveillance service and a second target further comprises comparing selected components of a first target report associated with an Automatic Dependent Surveillance-Broadcast (ADS-B) target surveillance service and a first target to selected components of a second target report associated with a Traffic Information Service target surveillance service and a second target.

2. A method for target correlation between target information in an air traffic control system, the method comprising:

comparing selected components of a first target report associated with a first target surveillance service and a first target to selected components of a second target report associated with a second target surveillance service and a second target;

producing a confidence level for each component comparison; and determining whether the first target of the first target report and the second target of the second target report represent the same target based on the confidence level for each component compared, wherein comparing the selected components of a first target report associated with a first target surveillance service and a first target to selected components of a second target report associated with a second target surveillance service and a second target further comprises implementing a probability model to compare the selected components.

3. A method for target correlation between target information in an air traffic control system, the method comprising:

comparing selected components of a first target report associated with a first target surveillance service and a first target to selected components of a second target report associated with a second target surveillance service and a second target;

producing a confidence level for each component comparison; and determining whether the first target of the first target report and the second target of the second target report represent the same target based on the confidence level for each component compared, wherein producing a confidence level further comprises implementing a probability model to produce a confidence level for each component comparison.

4. A method for target correlation between target information in an air traffic control system, the method comprising:

comparing selected components of a first target report associated with a first target surveillance service and a first target to selected components of a second target report associated with a second target surveillance service and a second target;

producing a confidence level for each component comparison; and determining whether the first target of the first target report and the second target of the second target report represent the same target based on the confidence level for each component compared, wherein producing a confidence level for each component comparison further comprises producing a confidence level for each component comparison based on predetermined values of either the first or second target surveillance service.

5. The method of claim 4, wherein the predetermined values are determined empirically from flight test data.

6. A method for target correlation between target information in an air traffic control system, the method comprising:

comparing selected components of a first target report associated with a first target surveillance service and a first target to selected components of a second target report associated with a second target surveillance service and a second target;

producing a confidence level for each component comparison; and determining whether the first target of the first target report and the second target of the second target report represent the same target based on the confidence level for each component compared, wherein producing a confidence level for each component comparison further comprises producing a confidence level for each component comparison, wherein the confidence level is defined as a formula having a predetermined target surveillance service component as a variable.

7. A method for target correlation between target information from different sources on associated targets in an air traffic control system, the method comprising:

determining similarity values for respective combinations of a first group of targets reporting from a first target surveillance service and a second group of targets reporting from a second target surveillance service utilizing a probability model function on target information received from the first target surveillance service and the second target surveillance service;

storing the similarity values in a correlation array; and correlating a first target with a second target that is similar based on a predetermined correlation parameter, wherein determining similarity values for respective combinations of a first group of targets from a first target surveillance service and a second group of targets from a second target surveillance service utilizing a probability model function further comprises determining similarity values for respective combinations of a first group of targets from an Automatic Dependent Surveillance-Broadcast target surveillance service and a second group of targets from a Traffic Information Service target surveillance service utilizing a fuzzy logic function.

8. A method for target correlation between target information from different sources on associated targets in an air traffic control system, the method comprising:

determining similarity values for respective combinations of a first group of targets reporting from a first target surveillance service and a second group of targets reporting from a second target surveillance service utilizing a probability model function on target information received from the first target surveillance service and the second target surveillance service;

storing the similarity values in a correlation array; and correlating a first target with a second target that is similar based on a predetermined correlation parameter, wherein correlating a first target with a second target that is similar based on a predetermined correlation parameter further comprises correlating an first target with a second target that is similar based on a range.

9. A computer program product for causing target correlation between target information in an air traffic control system, comprising a computer usable medium having computer readable program code means embodied in the medium for causing target correlation between target information in an air traffic control system, the computer readable program code including:

computer readable program code for causing said computer to compare selected components of a first target report associated with a first target surveillance service and a first target to selected components of a second target report associated with a second target surveillance service and a second target;

computer readable program code for causing said computer to produce a confidence level for each component comparison; and computer readable program code for causing said computer to determine that the first target and the second target represent that same target based on the confidence level for each component comparison, wherein the computer readable program code for causing said computer to compare selected components of a first target report associated with a first target surveillance service and a first target to selected components of a second target report associated with a second target surveillance service and a second target further comprises computer readable program code for causing said computer to compare selected components of first target report associated with an Automatic Dependent Surveillance-Broadcast target surveillance service and a first target to selected components of a second target report associated with a Traffic Information Service target surveillance service and a second target.

10. The computer program product of claim 9, wherein the computer readable program code further includes computer readable program code for causing said computer to combine the confidence levels to produce a total confidence level.

11. The computer program product of claim 10, wherein the computer readable program code for causing said computer to determine that the first target and the second target represent the same target based on the confidence level for each component comparison further comprises computer readable program code for causing said computer to determine that the first target and the second target represent the same target based on the total confidence level.

12. The computer product of claim 9, wherein the selected components of the first and second target reports comprise at least range, bearing, relative altitude and track angle.

13. The computer program product of claim 9, wherein the computer readable program code further includes computer readable program code for implementing probability models to compare selected components of the first and second target reports, producing a confidence level for each component comparison, and combining the confidence levels to produce a total confidence level.

* * * * *